US011525186B2

(12) United States Patent
Seetharaman et al.

(10) Patent No.: US 11,525,186 B2
(45) Date of Patent: Dec. 13, 2022

(54) CORROSION INHIBITOR FORMULATION FOR GEOTHERMAL REINJECTION WELL

(71) Applicant: ECOLAB USA INC., St. Paul, MN (US)

(72) Inventors: Jothibasu Seetharaman, Pune (IN); Santanu Banerjee, Pune (IN); Dinesh Mantri, Pune (IN)

(73) Assignee: Ecolab USA Inc., St. Paul, MN (US)

(*) Notice: Subject to any disclaimer, the term of this patent is extended or adjusted under 35 U.S.C. 154(b) by 0 days.

(21) Appl. No.: 16/885,685

(22) Filed: May 28, 2020

(65) Prior Publication Data

US 2020/0392630 A1 Dec. 17, 2020

Related U.S. Application Data

(60) Provisional application No. 62/859,850, filed on Jun. 11, 2019.

(51) Int. Cl.
| | |
|---|---|
| *C23F 11/167* | (2006.01) |
| *C22C 9/06* | (2006.01) |
| *C22C 38/00* | (2006.01) |
| *C23F 11/08* | (2006.01) |
| *C23F 11/173* | (2006.01) |

(52) U.S. Cl.
CPC ............ *C23F 11/1676* (2013.01); *C22C 9/06* (2013.01); *C22C 38/00* (2013.01); *C23F 11/08* (2013.01); *C23F 11/173* (2013.01)

(58) Field of Classification Search
CPC ..... C23F 11/1676; C23F 11/173; C23F 11/08; C23F 11/188; C22C 9/06; C22C 38/00; Y02E 10/10; C23C 22/68; F24T 2010/50; C09K 2208/32; C09K 8/54
See application file for complete search history.

(56) References Cited

U.S. PATENT DOCUMENTS

| | | | |
|---|---|---|---|
| 3,330,356 | A | 7/1967 | Hottman |
| 3,682,246 | A | 8/1972 | Closmann |
| 3,827,243 | A | 8/1974 | Paull et al. |

(Continued)

FOREIGN PATENT DOCUMENTS

| | | |
|---|---|---|
| CA | 2278084 A1 | 1/2000 |
| CA | 2995975 A1 | 2/2017 |

(Continued)

OTHER PUBLICATIONS

Burda, Paul A. et al. "Materials Corrosion During the Secondary Hydrogen Sulfide Abatement at the Geysers Power Plant," Proceedings of the International Symposium on Solving Corrosion and Scaling Problems in Geothermal Systems, meeting date Jan. 17-20, 1983, San Francisco, CA, (1984) 294-310.

(Continued)

*Primary Examiner* — Pamela H Weiss
(74) *Attorney, Agent, or Firm* — Eric D. Babych; Barnes & Thornburg LLP

(57) ABSTRACT

A method of inhibiting corrosion of a metal surface in contact with geothermal system is provided. The method may include contacting the metal surface with a corrosion inhibitor composition by adding the composition to geothermal process water. The corrosion inhibitor composition may include an organic phosphonate, an ortho phosphate, and zinc or a salt thereof.

20 Claims, 2 Drawing Sheets

(56) References Cited

U.S. PATENT DOCUMENTS

| | | | | |
|---|---|---|---|---|
| 3,858,397 | A | 1/1975 | Jacoby | |
| 3,864,208 | A | 2/1975 | Van Huisen | |
| 3,864,917 | A | 2/1975 | Jacoby | |
| 3,898,020 | A | 8/1975 | Matthews | |
| 3,938,592 | A | 2/1976 | Aladiev et al. | |
| 3,939,659 | A | 2/1976 | Matthews | |
| 3,958,635 | A | 5/1976 | Fischer et al. | |
| 4,015,663 | A | 4/1977 | Strubhar | |
| 4,019,577 | A | 4/1977 | Fitch et al. | |
| 4,030,549 | A | 6/1977 | Bouck | |
| 4,039,459 | A | 8/1977 | Fischer et al. | |
| 4,043,129 | A | 8/1977 | McCabe et al. | |
| 4,060,988 | A | 12/1977 | Arnold | |
| 4,078,610 | A | 3/1978 | Arnold | |
| 4,112,745 | A | 9/1978 | McCabe et al. | |
| 4,171,017 | A | 10/1979 | Klass | |
| 4,200,152 | A | 4/1980 | Foster et al. | |
| 4,211,613 | A | 7/1980 | Meckler | |
| 4,220,202 | A | 9/1980 | Madiev et al. | |
| 4,246,103 | A * | 1/1981 | Block | C02F 5/14 210/699 |
| 4,328,180 | A * | 5/1982 | Hansen | C23F 11/08 210/697 |
| 4,351,796 | A * | 9/1982 | Marshall | C23F 11/08 106/14.12 |
| 4,372,386 | A | 2/1983 | Rhoades et al. | |
| 4,476,930 | A | 10/1984 | Watanabe | |
| 4,501,667 | A * | 2/1985 | Cook | C02F 5/14 106/14.12 |
| 4,502,285 | A | 3/1985 | Awerbuch et al. | |
| 4,512,155 | A | 4/1985 | Sheinbaum | |
| 4,534,866 | A * | 8/1985 | Becker | C23F 14/02 210/697 |
| 4,547,540 | A * | 10/1985 | Yeoman | C23F 11/10 252/389.22 |
| 4,606,890 | A * | 8/1986 | Fisk | C02F 5/145 205/724 |
| 4,664,884 | A * | 5/1987 | Mullins | C23F 11/10 422/13 |
| 4,689,200 | A * | 8/1987 | Cook | C07F 9/3808 422/15 |
| 4,756,881 | A * | 7/1988 | Hoots | C23F 11/10 210/699 |
| 4,847,017 | A * | 7/1989 | Clubley | C10M 137/12 562/24 |
| 4,896,725 | A | 1/1990 | Parker et al. | |
| 4,996,846 | A | 3/1991 | Bronicki | |
| 5,018,577 | A * | 5/1991 | Pardue | C02F 5/14 166/279 |
| 5,020,328 | A | 6/1991 | Bronicki | |
| 5,023,000 | A * | 6/1991 | Kneller | C02F 5/14 210/697 |
| 5,085,794 | A | 2/1992 | Kneller et al. | |
| 5,145,515 | A | 9/1992 | Gallup et al. | |
| 5,227,133 | A | 7/1993 | Bucher et al. | |
| 5,228,509 | A | 7/1993 | Turon et al. | |
| 5,236,036 | A | 8/1993 | Ungemach et al. | |
| 5,294,371 | A * | 3/1994 | Clubley | C02F 5/14 252/389.23 |
| 5,338,477 | A * | 8/1994 | Chen | C02F 5/14 252/180 |
| 5,358,642 | A * | 10/1994 | Chen | C02F 5/14 210/700 |
| 5,370,182 | A | 12/1994 | Hickerson | |
| 5,403,493 | A | 4/1995 | Mouche et al. | |
| 5,483,797 | A | 1/1996 | Rigal et al. | |
| 5,497,624 | A | 3/1996 | Amir et al. | |
| 5,526,646 | A | 6/1996 | Bronicki et al. | |
| 5,534,157 | A * | 7/1996 | Iman | D21H 21/02 210/700 |
| 5,582,011 | A | 12/1996 | Bronicki et al. | |
| 5,867,988 | A | 2/1999 | Kaplan | |
| 5,871,691 | A * | 2/1999 | Carey | C23F 11/10 422/17 |
| 5,961,837 | A * | 10/1999 | Ferrara | C02F 1/54 210/696 |
| 6,083,403 | A * | 7/2000 | Tang | C02F 5/14 210/700 |
| 6,572,789 | B1 | 6/2003 | Yang et al. | |
| 6,585,933 | B1 * | 7/2003 | Ehrhardt | C23F 11/08 252/180 |
| 6,896,054 | B2 | 5/2005 | McClung, III | |
| 7,128,156 | B2 | 10/2006 | McClung, III | |
| 7,472,548 | B2 | 1/2009 | Meksvanh et al. | |
| 7,727,945 | B2 | 6/2010 | Rodrigues et al. | |
| 7,784,545 | B2 | 8/2010 | Maguire | |
| 8,146,664 | B2 | 4/2012 | Kaminsky et al. | |
| 8,176,971 | B2 | 5/2012 | McClung, III | |
| 8,201,626 | B2 | 6/2012 | Balczewski | |
| 8,235,141 | B2 | 8/2012 | Foppe | |
| 8,353,345 | B2 | 1/2013 | Rose et al. | |
| 8,833,475 | B2 | 9/2014 | Saar et al. | |
| 8,839,857 | B2 | 9/2014 | Schultz et al. | |
| 9,175,405 | B2 | 11/2015 | Gill et al. | |
| 9,309,473 | B2 | 4/2016 | McAlister | |
| 9,399,714 | B2 | 7/2016 | Zhang et al. | |
| 9,498,749 | B2 | 11/2016 | Weres | |
| 9,649,582 | B2 | 5/2017 | Shnell | |
| 9,688,903 | B2 | 6/2017 | Gill | |
| 9,739,509 | B2 | 8/2017 | Buscheck | |
| 9,765,604 | B2 | 9/2017 | Buscheck | |
| 9,869,167 | B2 | 1/2018 | Randolph | |
| 10,053,606 | B2 | 8/2018 | Virnelson et al. | |
| 2003/0007888 | A1 * | 1/2003 | Itzhak | C23F 11/185 422/7 |
| 2003/0063998 | A1 * | 4/2003 | Ghosh | C08F 8/32 422/16 |
| 2003/0063999 | A1 * | 4/2003 | Ghosh | C08F 22/40 422/16 |
| 2003/0065116 | A1 * | 4/2003 | Ghosh | C08F 22/40 526/258 |
| 2003/0200997 | A1 | 10/2003 | Cooper et al. | |
| 2003/0203827 | A1 | 10/2003 | Cooper et al. | |
| 2003/0209340 | A1 | 11/2003 | McClung, III | |
| 2004/0135125 | A1 | 7/2004 | Moriarty et al. | |
| 2005/0205260 | A1 | 9/2005 | McClung, III | |
| 2005/0244315 | A1 | 11/2005 | Bedford et al. | |
| 2006/0048770 | A1 | 3/2006 | Meksvanh et al. | |
| 2006/0113506 | A1 * | 6/2006 | Man | C11D 11/0041 252/186.1 |
| 2007/0107901 | A1 | 5/2007 | Maguire | |
| 2007/0119592 | A1 | 5/2007 | McClung, III | |
| 2008/0145271 | A1 | 6/2008 | Krhambi | |
| 2008/0289819 | A1 | 11/2008 | Kaminsky et al. | |
| 2009/0221455 | A1 | 9/2009 | Boles et al. | |
| 2010/0012885 | A1 | 1/2010 | Rodrigues | |
| 2010/0163231 | A1 | 7/2010 | Balczewski | |
| 2010/0243201 | A1 | 9/2010 | McClung, III | |
| 2011/0136718 | A1 | 6/2011 | Rodrigues et al. | |
| 2011/0272166 | A1 | 11/2011 | Hunt | |
| 2012/0080641 | A1 | 4/2012 | Relenyi | |
| 2012/0145397 | A1 | 6/2012 | Schultz et al. | |
| 2012/0298367 | A1 | 11/2012 | McClung, III | |
| 2013/0020079 | A1 | 1/2013 | Hopkins et al. | |
| 2014/0087978 | A1 | 3/2014 | Deville et al. | |
| 2014/0130498 | A1 | 5/2014 | Randolph | |
| 2014/0238672 | A1 | 8/2014 | Buscheck | |
| 2014/0242394 | A1 | 8/2014 | Tsubuku et al. | |
| 2014/0261567 | A1 * | 9/2014 | Miralles | C11D 3/378 134/28 |
| 2014/0262256 | A1 | 9/2014 | Zemach et al. | |
| 2014/0272133 | A1 * | 9/2014 | Gill | C23F 11/08 427/239 |
| 2014/0296113 | A1 | 10/2014 | Beuterbaugh et al. | |
| 2015/0004054 | A1 * | 1/2015 | Richardson | C02F 5/083 422/15 |
| 2015/0144345 | A1 | 5/2015 | Bilozir et al. | |
| 2015/0159917 | A1 | 6/2015 | Parrella et al. | |
| 2016/0186040 | A1 | 6/2016 | Gill | |
| 2016/0215400 | A1 * | 7/2016 | Kalakodimi | C23F 11/08 |

(56) References Cited

U.S. PATENT DOCUMENTS

| | | |
|---|---|---|
| 2017/0002629 A1 | 1/2017 | Hurtevent et al. |
| 2018/0100238 A1 | 4/2018 | Kryzman et al. |
| 2018/0106138 A1 | 4/2018 | Randolph |
| 2019/0062184 A1* | 2/2019 | Mantri .................. C08F 220/06 |
| 2019/0225855 A1* | 7/2019 | Yang ..................... C23F 11/187 |

FOREIGN PATENT DOCUMENTS

| | | |
|---|---|---|
| CN | 102606111 A | 7/2012 |
| CN | 103159332 A | 6/2013 |
| CN | 103410474 A | 11/2013 |
| CN | 104233310 A | 12/2014 |
| CN | 105332681 A | 2/2016 |
| CN | 105733541 A | 7/2016 |
| CN | 108048065 A | 5/2018 |
| DE | 2912430 A1 | 10/1979 |
| DE | 3316677 A1 | 12/1983 |
| DE | 102009033463 A1 | 1/2011 |
| EP | 3115712 B1 | 6/2018 |
| FR | 2470240 A1 | 5/1981 |
| FR | 2599424 A1 | 12/1987 |
| GB | 1540528 A | 2/1979 |
| GB | 2423516 A | 8/2006 |
| GB | 2556089 A | 5/2018 |
| JP | S56146585 A | 11/1981 |
| JP | 6339700 A | 2/1988 |
| JP | 06000954 B2 | 1/1994 |
| JP | 2008036562 A | 2/2008 |
| JP | 2009166532 A | 7/2009 |
| NO | 324664 B1 | 11/2007 |
| WO | 1994/21889 A2 | 9/1994 |
| WO | 2001029286 A1 | 4/2001 |
| WO | 2001044403 A1 | 6/2001 |
| WO | 2006043948 A1 | 4/2006 |
| WO | 2007088322 A1 | 8/2007 |
| WO | 2010082491 A1 | 7/2010 |
| WO | 2012/039631 A1 | 3/2012 |
| WO | 2013119343 A2 | 8/2013 |
| WO | 2015040137 A1 | 3/2015 |
| WO | 2015069229 A1 | 5/2015 |
| WO | 2015076852 A1 | 5/2015 |
| WO | 20160133259 A1 | 3/2016 |
| WO | 2016182980 A1 | 11/2016 |
| WO | 2017031103 A1 | 2/2017 |
| WO | 2017031282 A1 | 2/2017 |
| WO | 2013134180 A1 | 11/2017 |
| WO | 2018093272 A1 | 5/2018 |

OTHER PUBLICATIONS

Buyuksagis, A. et al. "Corrosion Inhibition of st37 Steel in Geothermal Fluid by Quercus robur and Pomegranate Peels Extracts," Protection of Metals and Physical Chemistry of Surfaces (2015) 51(5), 861-872.

Gill, Jasbir S. et al. "Effective Chemical Inhibitors for Corrosion Control in Geothermal Processes Especially Geysers and pH Mod Systems," GRC Transactions (2010) 34, 1029-1032.

Honegger, J.L. et al. "Detailed Study of Sulfide Scaling at La Coumeuve Nord, a Geothermal Exploitation of the Paris Basin, France," Geothermics (1989), 18(1-2), 137-144.

Ignatiadis, I. et al. "Reduction by Biocide Treatment of Hydrogen Sulfide Concentration in a Geothermal Brine," Microbially Influenced Corrosion and Biodeterioration, paper by the MIC Consortium Conference 1990, 8/33-8/36.

Ikeda, Akio et al. "Carbon Dioxide Corrosion Behavior of Carbon and Chromium Steels," The Sumitomo Search (1985), 31, 91-102.

Lichti, Keith A. et al. "Corrosion in Wairakei Steam Pipelines," Corrosion Reviews (1999), 17(3-4), 219-236.

Yoshinaga, Tetsutaro et al. "Inhibition of Silica-Scaling from Geothermal Water (A method of addition of organic compounds, II)," Chinetsu (Sep. 1987), 24(3), 246-260. (English abstract only).

Souza De E A, et al., "Evaluation of corrosion inhibitors for cooling water systems operating at high concentration cycles," , Wiley, vol. 60, No. 34, May 1, 2009 (May 1, 2009), pp. 323-329, XP001545565.

International Search Report for International Application No. PCT/US2020/034850, dated Aug. 21, 2020, 5 pages.

\* cited by examiner

CORROSION INHIBITOR FORMULATION FOR GEOTHERMAL REINJECTION WELL

BACKGROUND

1. Field of the Invention

The present invention generally relates to corrosion inhibition. More particularly, the present disclosure relates to a composition for inhibiting corrosion in a geothermal system.

2. Description of the Related Art

Geothermal energy is energy in the form of heat within the earth's interior, which can be tapped using geothermal wells. The earth's interior contains an enormous supply of heat, but challenges remain in extracting the heat for generating energy. Geothermal energy moves towards the earth's surface by thermal conduction through solid rock. Thermal energy can also be transmitted towards the earth's surface by movement of molten rock or by circulation of fluid ($H_2O$ as steam or water) through interconnected fractures and pores. Geothermal wells are in any instance relatively deep wells.

Geothermal brines and steam are generally used as the energy source. Geothermal brine is used in power generation, heating and electrical processes. Geothermal steam temperatures range from about 185° C. to about 370° C. (about 365° F. to about 700° F.). Steam is separated from the brine using flashing units. Low temperature brines can also be used to produce electricity binary units (secondary fluid units). The geothermal brines can have a salinity from less than about 1000 ppm to several hundred thousand ppm, and a content of non-condensable gases up to about 6 percent. Depending upon the salt content and application, geothermal fluids may be used directly or through a secondary fluid cycle. The use of geothermal energy as an energy source has risen in importance as other energy sources become less abundant and more expensive. This is a sustainable renewable source of energy, and unlike other renewable sources, geothermal energy is constantly available.

Corrosion of metal surfaces in aqueous media is a problem in the geothermal industry. For example, geothermal operations include contacting metal surfaces with corrosive components are present such as brines. These aggressive constituents can cause severe corrosion as evidenced by surface pitting, embrittlement, and general loss of metal. The metallic surfaces can be composed of high alloy steels including chrome steels, ferritic alloy steels, austenitic stainless steels, precipitation-45 hardened stainless steels, and high nickel content steels.

BRIEF SUMMARY

A method of inhibiting corrosion of a metal surface in contact with geothermal system is provided. The method may include contacting the metal surface with a corrosion inhibitor composition. The corrosion inhibitor composition may comprise an organic phosphonate, an ortho phosphate, and zinc or a salt thereof.

In some aspects, the organic phosphonate may be 2,2'-(hydroxyphosphoryl)disuccinic acid (PSO), 2-phosphonobutane-1,2,4-tricarboxylic acid (PBTC), ((dimethylamino)methylene)bis(phosphonic acid) (DMAMDP), N,N-dimethyl-1,1-diphosphonomethanamine oxide (DMAMDPO), (morpholinomethylene) bis(phosphonic acid) (MMDP), 4-(diphosphonomethyl)morpholine 4-oxide (MMDPO), hydroxyphosphono acetic acid (HPA), phosphino carboxylic acids (PCA), or any combination thereof.

In some aspects, the corrosion inhibitor composition may comprise from about 1 wt % to about 20 wt % of the organic phosphonate.

In some aspects, the corrosion inhibitor composition may comprise from about 10 wt % to about 40 wt % of the ortho phosphate.

In some aspects, the corrosion inhibitor composition may comprise from about 2 wt % to about 15 wt % of the zinc or the salt thereof.

In some aspects, the corrosion inhibitor composition may further comprise a fluorescent tracer.

In some aspects, the corrosion inhibitor composition may comprise from about 0.01 wt % to about 0.5 wt % of the fluorescent tracer.

In some aspects, the method may include passivating the metal surface with the corrosion inhibitor composition.

In some aspects, the metal surface may be in contact with an aqueous medium comprising from about 50 ppm to about 400 ppm of the corrosion inhibitor composition.

In some aspects, the metal surface may be in contact with an aqueous medium comprising a pH of from about 4 to about 8.

In some aspects, the corrosion inhibitor composition may be added to the aqueous medium at a dosage rate of from about 0.01 ppm to about 500 ppm.

In some aspects, the metal surface may be iron, copper, an iron alloy, a copper alloy, admiralty brass, about 90% copper and about 10% nickel, about 80% copper and about 20% nickel, about 70% copper and about 30% nickel, aluminium brass, manganese brass, leaded naval bronze, phosphor bronze, carbon, and any combination thereof.

In some aspects, the metal surface may comprise iron.

In some aspects, the metal surface may be mild steel or carbon steel.

In some aspects, a corrosion rate of the metal surface may be less than about 3 mpy.

In some aspects, a corrosion rate of the metal surface may be less than about 1 mpy.

In some aspects, the corrosion inhibitor composition may comprise a water-miscible co-solvent.

In some aspects, the water-miscible co-solvent may be selected from the group consisting of: acetone, methanol, ethanol, propanol, formic acid, formamide, propylene glycol, ethylene glycol, and any combination thereof.

In some aspects, the corrosion inhibitor composition may comprise an additive selected from the group consisting of: an additional corrosion inhibitor, a treatment polymer, an anti-microbial agent, an anti-scaling agent, a colorant, a filler, a buffer, a surfactant, a viscosity modifier, a chelating agent, a dispersant, a deodorant, a masking agent, an oxygen scavenger, an indicator dye, and any combination thereof.

Also provided, is a use of a corrosion inhibitor composition for inhibiting corrosion of a metal surface in contact with an aqueous medium in a geothermal system. The corrosion inhibitor composition may include an organic phosphonate, an ortho phosphate, and zinc or a salt thereof.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE DRAWINGS

A detailed description of the invention is hereafter described with specific reference being made to the drawings in which.

DETAILED DESCRIPTION

Figure 1:
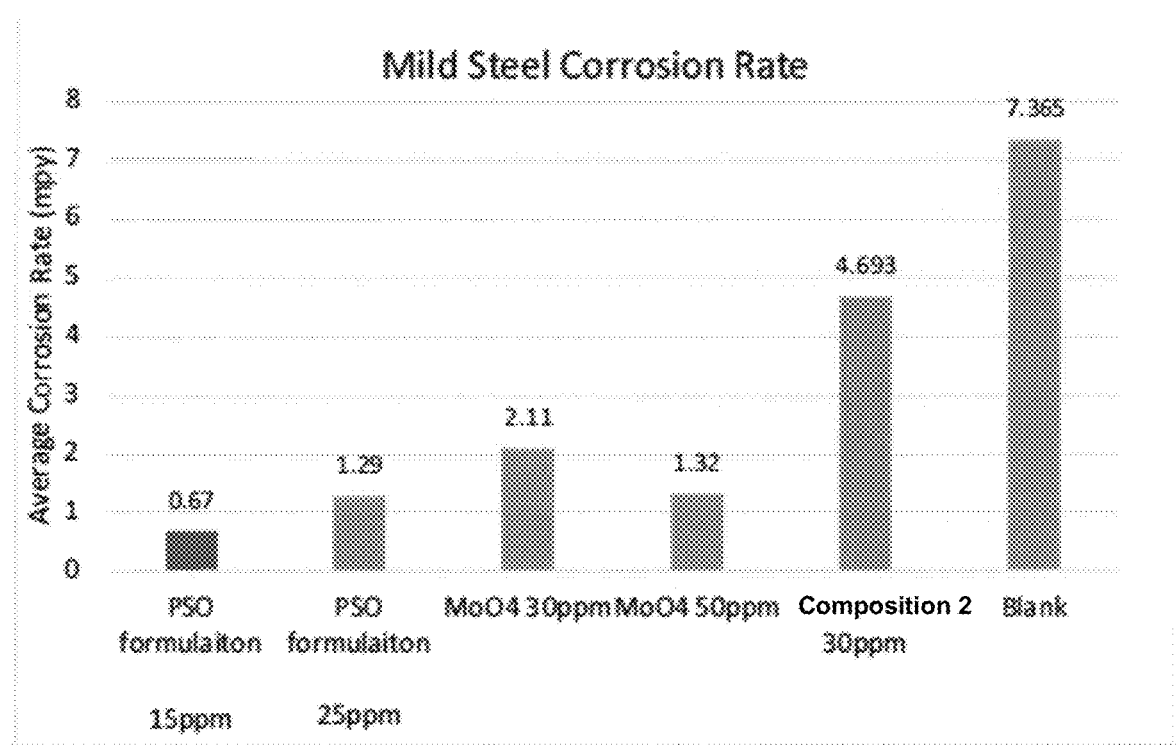
FIG. 1 shows corrosion data for the geothermal reinjection well water chemistry and metallurgy.

Various embodiments are described below. The relationship and functioning of the various elements of the embodiments may better be understood by reference to the following detailed description. However, embodiments are not limited to those illustrated below. In certain instances details may have been omitted that are not necessary for an understanding of embodiments disclosed herein.

A method of inhibiting corrosion of a metal surface in contact with geothermal system is provided. The method may include contacting the metal surface with a corrosion inhibitor composition. The corrosion inhibitor composition may comprise an organic phosphonate, an ortho phosphate, and zinc or a salt thereof.

In some aspects, the organic phosphonate may be 2,2'-(hydroxyphosphoryl)disuccinic acid (PSO), 2-phosphonobutane-1,2,4-tricarboxylic acid (PBTC), ((dimethylamino)methylene)bis(phosphonic acid) (DMAMDP), N,N-dimethyl-1,1-diphosphonomethanamine oxide (DMAMDPO), (morpholinomethylene) bis(phosphonic acid) (MMDP), 4-(diphosphonomethyl)morpholine 4-oxide (MMDPO), hydroxyphosphono acetic acid (HPA), phosphino carboxylic acids (PCA), or any combination thereof.

In some aspects, the organic phosphonate may be PSO. In some aspects, the organic phosphonate may be PBTC. In some aspects, the organic phosphonate may be DMAMDP. In some aspects, the organic phosphonate may be DMAMDPO. In some aspects, the organic phosphonate may be MMDP. In some aspects, the organic phosphonate may be MMDPO. In some aspects, the organic phosphonate may be HPA. In some aspects, the organic phosphonate may be PCA.

The corrosion inhibitor composition may comprise an effective amount of the organic phosphate to maximize corrosion inhibition. The amount of organic phosphonate in the composition may be from about 1 wt % to about 20 wt % of the organic phosphonate. In some aspects, the amount of organic phosphonate in the corrosion inhibitor composition may be about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, or about 19 wt %.

The corrosion inhibitor composition may comprise an effective amount of the ortho phosphate to maximize corrosion inhibition. The corrosion inhibitor composition may comprise from about 10 wt % to about 40 wt % of the ortho phosphate. In some aspects, the amount of ortho phosphate in the composition may be about 15 wt %, about 20 wt %, about 25 wt %, about 30 wt %, about 35 wt %, or about 40 wt %.

The corrosion inhibitor composition may comprise an effective amount of the zinc or salt thereof to maximize corrosion inhibition. In some aspects, the corrosion inhibitor composition may comprise from about 2 wt % to about 15 wt % of the zinc or the salt thereof. In some aspects, the amount of zinc in the composition may be about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, or about 15 wt %.

In some aspects, the corrosion inhibitor composition may further comprise a fluorescent tracer. In some aspects, the composition may include an inert tracer, making it compatible with fluorescent tracing technology such TRASAR® technology (available from Nalco® Company, Naperville, Ill., USA). In other aspects, an inert fluorescent tracer may be included in the composition to provide a means of determining the dosage level. A known proportion of the fluorescent tracer may be added either simultaneously or sequentially with the corrosion inhibitor. Effective inert fluorescent tracers may include those substances that are chemically non-reactive with other components in the system and that do not significantly degrade with time.

Representative inert fluorescent tracers include fluorescein or fluorescein derivatives; rhodamine or rhodamine derivatives; naphthalene sulfonic acids (mono-, di-, tri-, etc.); pyrene sulfonic acids (mono-, di-, tri-, tetra-, etc.); stilbene derivatives containing sulfonic acids (including optical brighteners); biphenyl sulfonic acids; phenylalanine; tryptophan; tyrosine; vitamin B2 (riboflavin); vitamin B6 (pyridoxin); vitamin E (a-tocopherols); ethoxyquin; caffeine; vanillin; naphthalene sulfonic acid formaldehyde condensation polymers; phenyl sulfonic acid formaldehyde condensates; lignin sulfonic acids; polycyclic aromatic hydrocarbons; aromatic (poly)cyclic hydrocarbons containing amine, phenol, sulfonic acid, carboxylic acid functionalities in any combination; (poly)heterocyclic aromatic hydrocarbons having N, O, or S; a polymer containing at least one of the following moieties: naphthalene sulfonic acids, pyrene sulfonic acids, biphenyl sulfonic acids, or stilbene sulfonic acids.

In some aspects, the corrosion inhibitor composition may comprise from about 0.01 wt % to about 0.5 wt % of the fluorescent tracer. The amount of fluorescent tracer in the composition or added separately from the composition may be sufficient to track the dosage level of the corrosion inhibitor in the aqueous system.

In some aspects, the metal surface may be iron, copper, an iron alloy, a copper alloy, admiralty brass, about 90% copper and about 10% nickel, about 80% copper and about 20% nickel, about 70% copper and about 30% nickel, aluminium brass, manganese brass, leaded naval bronze, phosphor bronze, carbon, and any combination thereof. In some aspects, the metal surface may comprise iron. In some aspects, the metal surface may be mild steel or carbon steel.

In some aspects, the method may include passivating the metal surface with the corrosion inhibitor composition. Passivating the metal surface may include adding the composition directly to a metal surface or adding the composition to an aqueous system at a higher dosage for a certain period of time and then reducing the dosage to a maintenance dose.

In some aspects, the metal surface may be in contact with an aqueous medium comprising from about 50 ppm to about 400 ppm of the corrosion inhibitor composition.

In some aspects, the corrosion inhibitor can be added to the aqueous medium at a concentration of from about 1 ppm to about 1000 ppm, from about 1 ppm to about 800 ppm, from about 1 ppm to about 600 ppm, from about 1 ppm to about 500 ppm, from about 1 ppm to about 400 ppm, from about 1 ppm to about 200 ppm, from about 5 ppm to about 1000 ppm, from about 5 ppm to about 800 ppm, from about 5 ppm to about 600 ppm, from about 5 ppm to about 500 ppm, from about 5 ppm to about 400 ppm, or from about 5 ppm to about 200 ppm. In some aspects, the corrosion inhibitor composition may be added to the aqueous medium at a dosage rate of from about 0.01 ppm to about 500 ppm.

In some aspects, the metal surface may be in contact with an aqueous medium that has a pH of from about 4 to about 8. In some aspects, the pH of the aqueous medium is about 4.5, about 5, about 5.5, about 6, about 6.5, about 7, or about 7.5.

The compositions disclosed herein are capable of reducing the corrosion rate of metal surfaces in contact with an aqueous medium in a geothermal system. The corrosion rate of the metal surface may be less than about 3 mpy. In some aspects, the corrosion rate of the metal surface may be less than about 2.5 mpy, about 2 mpy, 1.5 mpy, or about 1 mpy.

In some aspects, the corrosion inhibitor composition may comprise a water-miscible co-solvent. Examples of water-miscible co-solvents include, but are not limited to, acetone, methanol, ethanol, propanol, formic acid, formamide, propylene glycol, or ethylene glycol.

The corrosion inhibitor composition may comprise an additive. Examples of additives include, but are not limited to, an additional corrosion inhibitor, a treatment polymer, an anti-microbial agent, an anti-scaling agent, a colorant, a filler, a buffer, a surfactant, a viscosity modifier, a chelating agent, a dispersant, a deodorant, a masking agent, an oxygen scavenger, an indicator dye, or an anti-foaming agent.

In some aspects, the method may include adding an anti-foaming agent to the process water used in the geothermal system. The process water may be geothermal cooling water or geothermal condensate. Examples of anti-foaming agents include, but are not limited, to $C_5$-$C_{25}$ alkyl alcohol, $C_5$-$C_{25}$ alkyl alcohol ethoxylate, monobasic aluminum stearate, stearic acid, polydimethylsiloxane, sorbitan monostearate, hydrated silica, ethoxylated sorbitan monostearate, xanthan gum, and amorphous silica. In some embodiments, the anti-foaming agent may include water, polydimethylsiloxane, and sorbitan monostearate. In other aspects, the anti-foaming agent may consist of water, polydimethylsiloxane, sorbitan monostearate, hydrated silica, ethoxylated sorbitan monostearate, and xanthan gum.

In some aspects, the anti-foaming agent may be added to the process water in an amount of about 0.001 ppm to about 100 ppm. In some embodiments, the anti-foaming agent may be added to the process water in an amount of about 0.001 ppm to about 10 ppm, about 0.001 ppm to about 5 ppm, about 0.01 ppm to about 10 ppm, about 0.05 ppm to about 5 ppm, about 0.05 ppm to about 2 ppm, about 0.05 ppm to about 10 ppm, or about 0.1 ppm to about 1 ppm.

In certain aspects, an iron catalyst may be added to the process water. In other aspects, an iron catalyst is not added to the process water. An iron catalyst may include iron salt, iron complexes, or combinations thereof. Iron catalysts may be, for example, ferrous sulfate, ferric sulfate, ferric chloride, ferrous gluconate, ferric nitrate, iron (III) hydroxide oxide [FeO(OH)], ferrous chloride, ferrous iodide, iron sulfide, iron 4-cyclohexyl-butyrate, ferric oxide, ferric bromide, ferrous fluoride, iron powder, ferrous acetate, ferrous oxalate, ferric oxalate, and the like.

In certain aspects, hydrogen peroxide may be added to the process water. In other aspects, hydrogen peroxide is not added to the process water.

Additional corrosion inhibitors that may be included in the composition or added separately to the process water include a monomeric or oligomeric fatty acid, such as $C_{14}$-$C_{22}$ saturated and unsaturated fatty acids, as well as dimer, trimer and oligomer products obtained by polymerizing one or more of such fatty acids. The corrosion inhibitor can be a triazole. Examples of triazoles include, but are not limited to, benzotriazole, tolyltriazole, butylbenzotriazole, halobenzotriazoles, halo-tolyltriazoles, or nitrated-triazoles. In some aspects, the additional corrosion inhibitor can be a 2-substituted benzimidazole.

In some aspects, the additional corrosion inhibitor can include benzyl-($C_{12}$-$C_{16}$ alkyl)-dimethyl-ammonium chloride. In some embodiments, the corrosion inhibitor comprises benzyl-($C_{12}$-$C_{16}$ alkyl)-dimethyl-ammonium chloride, an ethoxylated alcohol phosphate salt, an imidazoline salt, 2-mercaptoethanol, ethylene glycol, diethylene glycol, methanol, 2-butoxyethanol, and water. In some embodiments, the corrosion inhibitor comprises sodium gluconate.

EXAMPLES

Example 1

The compounds used in these examples include phosphonate (CAS No. 770734-50-4), phosphoric acid (CAS No. 7664-38-2), zinc chloride (CAS No. 7646-85-7), and a fluorescent tracer (CAS No. 59572-10-0). Composition 1 includes PSO, phosphoric acid, zinc chloride, and a fluorescent tracer. Composition 2 includes tall oil imidazoline acetates, quaternary ammonium compounds and substituted carboxylic acids.

A composition containing molybdate ($MoO_4$) as corrosion inhibitor was tested in conditions mimicking geothermal reinjection well water. However, high doses of molybdate were required to achieve acceptable corrosion inhibition. Unexpectedly, it was discovered that a composition containing a phosphonate, phosphoric acid, and zinc provided the best corrosion inhibition even at a pH of about 5 to 6.5 in the geothermal reinjection well. The Gamry corrosion data conducted by mimicking reinjection well condition with the lower pH. The measured corrosion rate was less than about 1 mpy.

FIG. 1 shows the corrosion rate for different chemistries. Blank average corrosion rate was 7.35 mpy. Composition 1 outperformed the other chemistries with a corrosion rate of 0.67 mpy (the coupon looked clear without any corrosion). The metal coupon was passivated using about 100 ppm of Composition 1 for 18 hour and then the dose was lowered to about 15 ppm for 24 hour. The coupon treated with $MoO_4$ had visibly started corroding. The average corrosion rate was 2.1 mpy for 30 ppm $MoO_4$ and 1.32 mpy for 50 ppm $MoO_4$. The $MoO_4$ treated coupons were passivated using 100 ppm $MoO_4$ for 18 hours and then the dose was lowered to 30 ppm and 50 ppm $MoO_4$.

Example 2

Water was prepared containing Ca 1.3 ppm; Mg 0.1 ppm; alkalinity 68 ppm as $CaCO_3$; and sulphate as ion 93 ppm to simulate geothermal reinjection well water. The pH of the water was adjusted to 6.3 using diluted sulphuric acid. About one liter of the water was added to a Gamry cell and inhibitor was added for passivation according to Table 1, and the corrosion rate was measured for about 18 hours. The water was then replaced with fresh water having the maintenance dosing of the inhibitor, and the water was heated to about 40° C. The pH was maintained at about 6 to 6.3 for about 24 hours.

TABLE 1

| Test | Inhibitor | Passivation 18 hr @ RT | Maintenance dose 24 hr @ 40° C. | pH |
|---|---|---|---|---|
| 1 | Comp. 1 | 100 ppm | 15 ppm | 6-6.3 |
| 2 | Comp. 1 | 100 ppm | 25 ppm | 6-6.3 |
| 3 | MoO4 (25%) | 100 ppm | 30 ppm | 6-6.3 |
| 4 | MoO4 (25%) | 100 ppm | 50 ppm | 6-6.3 |
| 5 | MoO4 (25%) | 100 ppm | 100 ppm | 6-6.3 |
| 6 | Comp. 2 | 100 ppm | 30 ppm | 6-6.3 |

Figure 2:
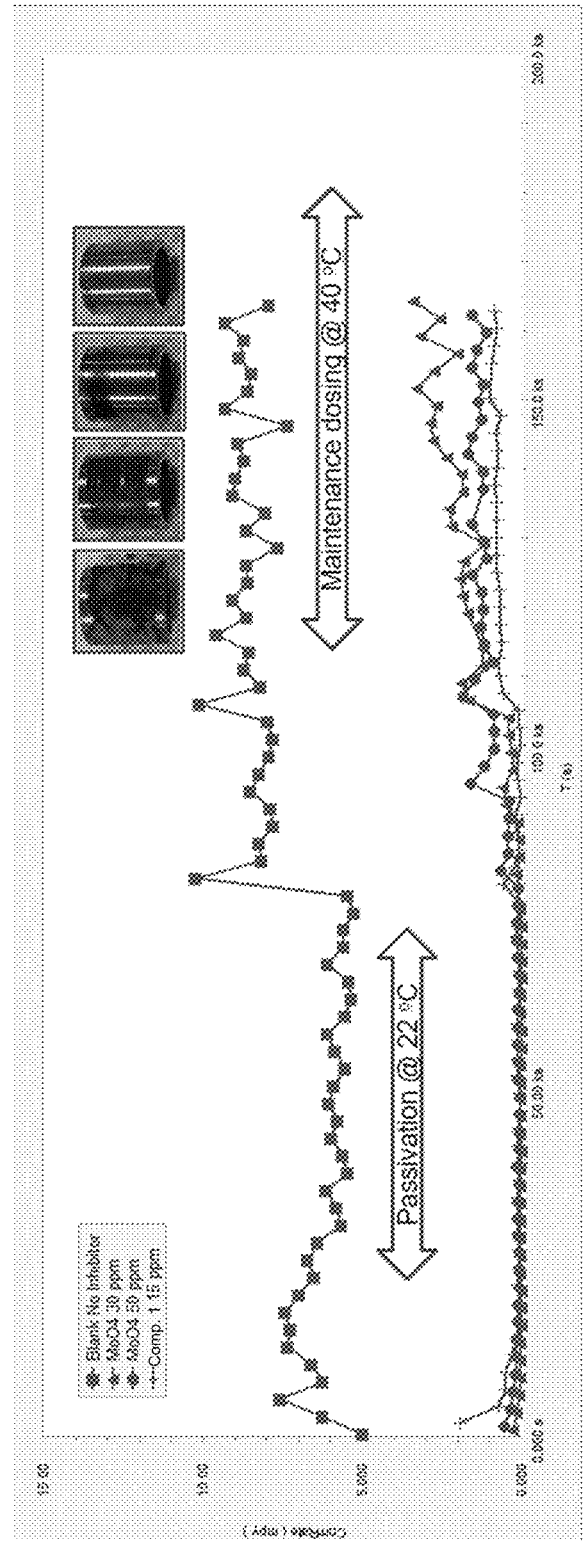
FIG. 2 shows the corrosion rate in mpy over time for various chemistries compared to no treatment.

The metal was a mild steel and Composition 1 provided the best corrosion control at a dose of about 15 ppm. No corrosion was observed on the coupons treated with Composition 1. The average corrosion rate was about 0.6 mpy. FIG. 2 shows the corrosion rate for the different tests over time.

The average corrosion rate for $MoO_4$ at 50 ppm dosing was about 1.3 mpy, but the coupon started corroding, which was comparatively better than 30 ppm $MoO_4$. Composition 2-treated metal coupons started corroding during the 100 pm passivation step and the average corrosion rate was 4.0 mpy. Blank corrosion rate was above about 5 mpy even at room temperature.

Any composition disclosed herein may comprise, consist of, or consist essentially of any of the compounds/components disclosed herein. In accordance with the present disclosure, the phrases "consist essentially of," "consists essentially of," "consisting essentially of," and the like limit the scope of a claim to the specified materials or steps and those materials or steps that do not materially affect the basic and novel characteristic(s) of the claimed invention.

As used herein, the term "about" refers to the cited value being within the errors arising from the standard deviation found in their respective testing measurements, and if those errors cannot be determined, then "about" refers to within 5% of the cited value.

Any method disclosed herein may comprise, consist of, or consist essentially of any method step disclosed herein or any combination of two or more of the method steps disclosed herein.

Unless specified otherwise, all molecular weights referred to herein are weight average molecular weights and all viscosities were measured at 25° C. with neat (not diluted) polymers.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a dispersant" is intended to include "at least one dispersant" or "one or more dispersants."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A method of inhibiting corrosion of a metal surface in contact with a geothermal system, comprising:
    contacting the metal surface with a corrosion inhibitor composition, the corrosion inhibitor composition comprising an organic phosphonate, an ortho phosphate, and zinc or a salt thereof,
    wherein the organic phosphonate is 2,2'-(hydroxyphosphoryl)disuccinic acid (PSO),
    wherein the metal surface is in contact with an aqueous medium comprising a pH of from 4 to 7.5.

2. The method of claim 1, wherein the corrosion inhibitor composition comprises from about 1 wt % to about 20 wt % of the organic phosphonate.

3. The method of claim 1, wherein the corrosion inhibitor composition comprises from about 10 wt % to about 40 wt % of the ortho phosphate.

4. The method of claim 1, wherein the corrosion inhibitor composition comprises from about 2 wt % to about 15 wt % of the zinc or the salt thereof.

5. The method of claim 1, wherein the corrosion inhibitor composition further comprises a fluorescent tracer.

6. The method of claim 5, wherein the corrosion inhibitor composition comprises from about 0.01 wt % to about 0.5 wt % of the fluorescent tracer.

7. The method of claim 1, wherein the metal surface is in contact with an aqueous medium comprising from about 50 ppm to about 400 ppm of the corrosion inhibitor composition.

8. The method of claim 1, wherein the metal surface is in contact with an aqueous medium comprising a pH of from 5 to 6.5.

9. The method of claim 8, wherein the corrosion inhibitor composition is added to the aqueous medium at a dosage rate of from about 0.01 ppm to about 500 ppm.

10. The method of claim 1, wherein the metal surface comprises metals selected from the group consisting of: iron, copper, an iron alloy, a copper alloy, admiralty brass, about 90% copper and about 10% nickel, about 80% copper and about 20% nickel, about 70% copper and about 30% nickel, aluminium brass, manganese brass, leaded naval bronze, phosphor bronze, carbon, and any combination thereof.

11. The method of claim 1, wherein the metal surface comprises iron.

12. The method of claim 1, wherein the metal surface is mild steel or carbon steel.

13. The method of claim 1, wherein a corrosion rate of the metal surface is less than about 3 mpy.

14. The method of claim 1, wherein a corrosion rate of the metal surface is less than about 1 mpy.

15. The method of claim 1, wherein the corrosion inhibitor composition comprises a water-miscible co-solvent.

16. The method of claim 15, wherein the water-miscible co-solvent is selected from the group consisting of: acetone, methanol, ethanol, propanol, formic acid, formamide, propylene glycol, ethylene glycol, and any combination thereof.

17. The method of claim 1, wherein the corrosion inhibitor composition comprises an additive selected from the group consisting of: an additional corrosion inhibitor, a treatment polymer, an anti-microbial agent, an anti-scaling agent, a colorant, a filler, a buffer, a surfactant, a viscosity modifier, a chelating agent, a dispersant, a deodorant, a masking agent, an oxygen scavenger, an indicator dye, and any combination thereof.

18. The method of claim 1, wherein the corrosion inhibitor composition further comprises an anti-foaming agent comprising water, polydimethylsiloxane, sorbitan monostearate, hydrated silica, ethoxylated sorbitan monostearate, and xanthan gum.

19. The method of claim 5, wherein the fluorescent tracer is selected from the group consisting of fluorescein, a fluorescein derivatives, rhodamine, a rhodamine derivative, a naphthalene sulfonic acid, a pyrene sulfonic acid, and any combination thereof.

20. The method of claim 1, wherein the corrosion inhibitor composition comprises PSO, phosphoric acid, zinc chloride, and a fluorescent tracer.

* * * * *